Feb. 9, 1937.   M. KURILLO   2,069,765
PRESSURE RESISTING SHAFT MOUNTING
Filed Feb. 10, 1936
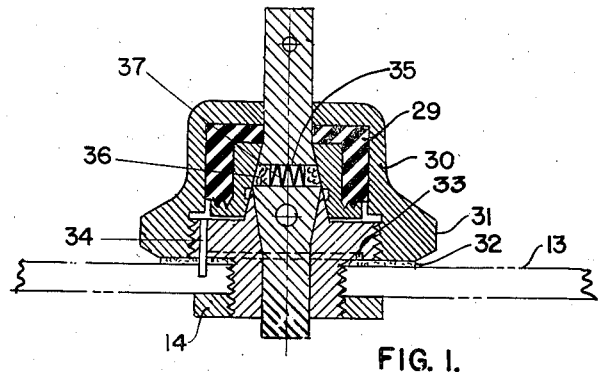
FIG. 1.
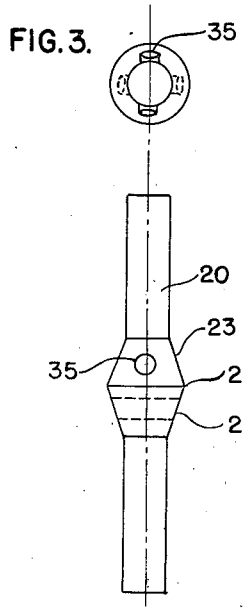
FIG. 3.
FIG. 2.
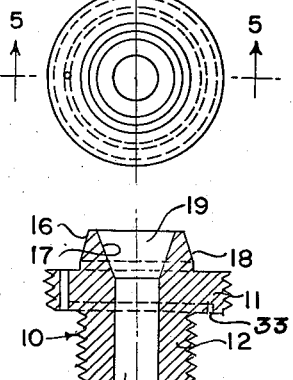
FIG. 4.
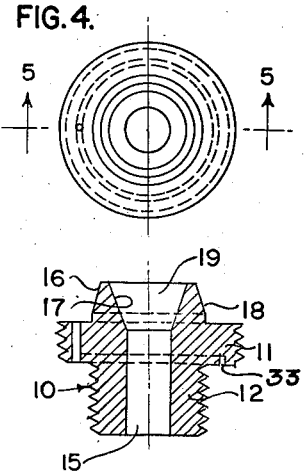
FIG. 5.
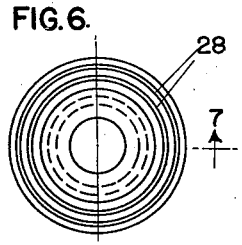
FIG. 6.
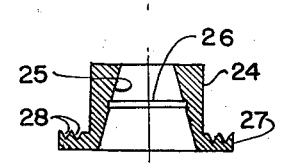
FIG. 7.
INVENTOR
MAX KURILLO
BY
Robert A. Lavender
ATTORNEY

UNITED STATES PATENT OFFICE 2,069,765

PRESSURE RESISTING SHAFT MOUNTING

Max Kurillo, Washington, D. C.

Application February 10, 1936, Serial No. 63,158

4 Claims. (Cl. 286—7)

(Granted under the act of March 3, 1883, as amended April 30, 1928; 370 O. G. 757)

This invention relates to pressure resisting shaft mounting such as stuffing boxes and glands and it has for its principal object the provision of a mounting of this type which is non-magnetic in character and is particularly adaptable for switches, electrical telegraph equipment employed in marine installations and for use on the decks of submarine vessels where extreme pressures are encountered and where the mounting is subjected to the corrosive action of sea water.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical effect, without limiting the improvements in their useful application to the particular construction, which, for the purpose of explanation, have been made the subject of illustration.

In the accompanying drawing:

Fig. 1 is a longitudinal sectional view through a shaft mounting or gland embodying the invention;

Fig. 2 is an elevational view of the shaft element shown in Fig. 1;

Fig. 3 is an end elevational view of the shaft shown in Fig. 2;

Fig. 4 is a plan view of the base element of the gland;

Fig. 5 is a longitudinal sectional view of the base element taken on line 5—5 of Fig. 4;

Fig. 6 is a plan view of the bushing element of the gland; and

Fig. 7 is a longitudinal sectional view taken on line 7—7 of Fig. 6.

Referring to the drawing, a pressure resisting shaft mounting or gland constructed in accordance with the invention is shown as comprising a base member 10 provided with a screw threaded flange portion 11 and with a screw threaded shank portion 12 adapted to project through an opening in a plate or the like 13 indicated by broken lines and secured against displacement therein with the body portion 11 abutting the outer surface of the plate by means of a lock nut 14. The base member is preferably formed of bronze or other corrosion resisting and self-lubricating material and is provided with a bore 15 extending axially therethrough, the outer or pressure end of which is surrounded by an annular flange 16 having outwardly converging internal and external surfaces 17 and 18, respectively, the former continuing into the bore for a slight distance so as to provide a flared outer end or conical seat 19. Extending through the bore 15 is a shaft 20 formed with an enlargement 21 intermediate its ends, said enlargement having oppositely inclined inner and outer frusto-conical surfaces 22 and 23, respectively, the former conforming to the angularity of the interior inclined wall 17 of the seat 19 and accurately fitting therein, and the latter conforming to the angularity of the exterior surface 18 of the flange 16 and forming a continuation thereof.

Surrounding the enlargement 21 is a sleeve 24 also of bronze formed with a frusto-conical internal surface 25 conforming to the angularity of the surfaces 18 and 23 of the flange 16 and enlargement 21, respectively, and intimately contacting therewith. The surfaces 17 and 18 of the flange 16, the surfaces 22 and 23 of the enlargement 21 and the surface 25 of the sleeve 24 are preferably all lapped with precision so as to obtain a very accurate and leak-proof junction between the several parts. The sleeve 24 is also formed with an internal circumferential groove 26 for containing a suitable lubricant and with a circumferential flange 27 provided with concentric grooves 28 in its outer surface for also containing a lubricant.

A gasket 29 formed of vulcanized rubber surrounds the upper portion of the shaft 20 and sleeve 24 and firmly seated upon the flange 27, and a coating of dry graphite may be applied to the outer surface of the sleeve 24 so as to insure a close fit and preserve the gasket against deterioration and permanent union with the sleeve through the migration of the sulphur content of the rubber. Surrounding the assembly of parts above mentioned is a housing 30 preferably formed of brass which is formed with the usual hexagonal portion 31 for engagement by a wrench and which is threaded onto the flange portion 11 of the base 10 and securely clamping the parts together. A gasket 32 is interposed between the flange 11 and housing 30 and the plate 13 so as to insure against leakage. The inner surface of the flange 11 may be formed with an annular groove 33 for containing a leak-proof cement or the like and the member 10 may be fixed against rotation by means of a pin 34 extending through the flange 11 thereof for engagement with a recess provided in the plate 13.

In order to provide further against leakage and to facilitate the rotation of the shaft 18 not withstanding the snug fit between the various elements, the shaft is provided wih two transversely extending bores 35 each containing wicks 36 of felt or other absorbent material which are saturated with a light oil and which are biased outwardly against the interior surface 25 of the sleeve 24 by an interposed coil spring 37.

The construction hereinabove described is not only extremely resistant with respect to both leakage and corrosion, but is also non-magnetic and self-lubricating in character.

The invention may be modified in construction and proportion and arrangement of the parts by one skilled in the art without departing from the nature and scope of the invention, as defined in the appended claims.

The invention described herein may be manufactured and used by or for the Government of the United States of America for governmental purposes without the payment of any royalties thereon or therefor.

I claim:

1. A pressure resisting shaft mounting comprising a base member adapted to be secured within an opening in a plate or the like and having a bore extending therethrough and a flange surrounding the outer end of said bore formed with outwardly converging internal and external surfaces; a shaft extending through said bore and having an enlargement intermediate its ends provided with inner and outer oppositely inclined circumferential surfaces, the innermost of said surfaces conforming to the inclination of the internal surface of said flange and disposed in contact therewith; a sleeve surrounding said shaft and flange and provided with an inclined internal surface conforming to and disposed in contact with the inclined external surfaces of said enlargement and said flange; and a housing surrounding said shaft and secured to said base member for clamping said sleeve against both said enlargement and said flange.

2. A pressure resisting shaft mounting comprising a base member adapted to be secured within an opening in a plate or the like and having a bore extending therethrough and a flange surrounding the outer end of said bore formed with outwardly converging internal and external surfaces; a shaft extending through said bore and having an enlargement intermediate its ends provided with inner and outer oppositely inclined circumferential surfaces, the innermost of said surfaces conforming to the inclination of the internal surface of said flange and disposed in contact therewith; a sleeve surrounding said shaft and flange and provided with an inclined internal surface conforming to and disposed in contact with the inclined external surfaces of said enlargement and said flange; a housing surrounding said shaft and secured to said base member, and yieldable means interposed between said sleeve and said housing for clamping said sleeve against both said enlargement and said flange.

3. A pressure resisting shaft mounting comprising a base member adapted to be secured within an opening in a plate or the like and having a bore extending therethrough and a flange surrounding the outer end of said bore formed with outwardly converging internal and external surfaces; a shaft extending through said bore and having an enlargement intermediate its ends provided with inner and outer oppositely inclined circumferential surfaces, the innermost of said surfaces conforming to the inclination of the internal surface of said flange and disposed in contact therewith; a sleeve surrounding said shaft and flange and provided with an inclined internal surface conforming to and disposed in contact with the inclined external surfaces of said enlargement and said flange; a housing surrounding said shaft and having a screw threaded connection with said base member for clamping said sleeve against both said enlargement and said flange; and a gasket of vulcanized rubber having a graphite coating and interposed between said sleeve and said housing.

4. A pressure resisting shaft mounting comprising a base member adapted to be secured within an opening in a plate or the like and having a bore extending therethrough and a flange surrounding the outer end of said bore formed with outwardly converging internal and external surfaces; a shaft extending through said bore and having an enlargement intermediate its ends provided with inner and outer oppositely inclined circumferential surfaces, the innermost of said surfaces conforming to the inclination of the internal surface of said flange and disposed in contact therewith; a sleeve surrounding said shaft and flange and provided with an inclined internal surface conforming to and disposed in contact with the inclined external surfaces of said enlargement and said flange, said sleeve being also formed with a circumferential flange having grooves therein for receiving a lubricant; a housing surrounding said shaft and secured to said base member for clamping said sleeve against both said enlargement and said flange; and a gasket disposed between said sleeve and said housing and having a seating engagement with said flange.

MAX KURILLO.